US010168815B2

(12) United States Patent
Cardonha et al.

(10) Patent No.: US 10,168,815 B2
(45) Date of Patent: Jan. 1, 2019

(54) EVALUATION OF DIGITAL CONTENT USING INTENTIONAL USER FEEDBACK OBTAINED THROUGH HAPTIC INTERFACE

(71) Applicant: International Business Machines Corporation, Armonk, NY (US)

(72) Inventors: Carlos H. Cardonha, Sao Paolo (BR); Fernando L. Koch, Sao Paulo (BR)

(73) Assignee: International Business Machines Corporation, Armonk, NY (US)

( * ) Notice: Subject to any disclaimer, the term of this patent is extended or adjusted under 35 U.S.C. 154(b) by 373 days.

(21) Appl. No.: 15/040,207

(22) Filed: Feb. 10, 2016

(65) Prior Publication Data
US 2016/0162095 A1   Jun. 9, 2016

Related U.S. Application Data

(63) Continuation of application No. 14/283,393, filed on May 21, 2014.

(51) Int. Cl.
*G06F 3/041* (2006.01)
*G06F 3/01* (2006.01)
(Continued)

(52) U.S. Cl.
CPC ............. *G06F 3/0414* (2013.01); *G06F 3/01* (2013.01); *G06F 3/016* (2013.01); *G06F 3/0482* (2013.01);
(Continued)

(58) Field of Classification Search
CPC .......... G06F 3/017; G06F 3/013; G06F 3/005; G06F 3/01; G06F 3/011; G06F 3/014; G06F 3/016; G06F 3/012
See application file for complete search history.

(56) References Cited

U.S. PATENT DOCUMENTS 5,306,154 A     4/1994   Ujita et al.
8,059,104 B2   11/2011   Shahoian et al.
(Continued)

FOREIGN PATENT DOCUMENTS

CA     2769105        10/2012
EP     2417904         2/2012
WO     2013049248      4/2013

OTHER PUBLICATIONS

R.L. Williams II et al., "Haptics-Augmented Engineering Mechanics Educational Tools," World Transactions on Engineering and Technology Education, UICEE, 2007 4 pages, vol. 6, No. 1.
(Continued)

*Primary Examiner* — Olga Merkoulova
(74) *Attorney, Agent, or Firm* — David M. Quinn; Ryan, Mason & Lewis, LLP

(57) ABSTRACT

Systems and methods are provided for evaluating the quality of automatically composed digital content based on intentional user feedback obtained through a haptic interface. For example, a method includes accessing intentional user feedback collected by a haptic interface executing on a computing device, wherein the intentional user feedback provides an indication as to a user's reaction toward digital content that the user interacts with on the computing device. The digital content includes content that is automatically generated using content generation rules. The method further includes evaluating a quality of the digital content based on the intentional user feedback, and generating an evaluation report that includes information providing an evaluation of the quality of the digital content.

15 Claims, 14 Drawing Sheets

(51) Int. Cl.
*G08B 6/00* (2006.01)
*G06F 3/0482* (2013.01)
*G06F 3/0484* (2013.01)
*G06F 3/0488* (2013.01)

(52) U.S. Cl.
CPC ...... *G06F 3/04842* (2013.01); *G06F 3/04883* (2013.01); *G08B 6/00* (2013.01); *G06F 2203/011* (2013.01); *G06F 2203/014* (2013.01)

(56) References Cited

U.S. PATENT DOCUMENTS

| | | | |
|---|---|---|---|
| 8,390,572 B2 | 3/2013 | Marsden et al. | |
| 8,395,626 B2 | 3/2013 | Millman | |
| 2003/0068053 A1* | 4/2003 | Chu | G06F 3/016 381/118 |
| 2010/0156818 A1* | 6/2010 | Burrough | G06F 3/016 345/173 |
| 2010/0317400 A1 | 12/2010 | Bivens et al. | |
| 2011/0214044 A1 | 9/2011 | Davis et al. | |
| 2012/0069131 A1 | 3/2012 | Abelow | |
| 2012/0088221 A1 | 4/2012 | Moen et al. | |
| 2012/0242584 A1* | 9/2012 | Tuli | G06F 3/016 345/173 |
| 2012/0249475 A1* | 10/2012 | Murphy | G06F 1/1694 345/174 |
| 2013/0078600 A1 | 3/2013 | Fischer et al. | |
| 2013/0079128 A1 | 3/2013 | Thomas et al. | |
| 2013/0080565 A1 | 3/2013 | van Coppenolle et al. | |
| 2014/0189539 A1 | 7/2014 | St. Clair et al. | |
| 2014/0325068 A1* | 10/2014 | Assuncao | H04L 41/082 709/226 |
| 2015/0005039 A1 | 1/2015 | Liu et al. | |
| 2015/0057804 A1* | 2/2015 | Som | B25J 13/06 700/264 |
| 2015/0100891 A1 | 4/2015 | Tobin | |
| 2015/0185840 A1 | 7/2015 | Golyshko et al. | |
| 2015/0227972 A1 | 8/2015 | Tang | |
| 2015/0339022 A1 | 11/2015 | Cardonha et al. | |
| 2015/0339588 A1 | 11/2015 | Cardonha et al. | |

OTHER PUBLICATIONS

K.L. Palmerius et al., "The Impact of Feedback Design in Haptic Volume Visualization," IEEE Third Joint Eurohaptics Conference and Symposium on Haptic Interfaces for Virtual Environment and Teleoperator Systems, Mar. 2009, pp. 154-159.

M.A. Srinivasan, "What is Haptics?" Massachusetts Institute of Technology, 1995, 11 pages.

V.G. Chouvardas et al., "Tactile Display Applications: A State of the Art Survey," Proceedings of the 2nd Balkan Conference in Informatics (BCI), Nov. 2005, 14 pages.

S. Paneels et al., "Review of Designs for Haptic Data Visualization," IEEE Transactions on Haptics, Apr.-Jun. 2010, 19 pages, vol. 3, No. 2.

F. Koch, "A Cost Analysis of Cloud Computing for Education," 9th International Conference on Economics of Grids, Clouds, Systems, and Services (GECON), Nov. 2012, pp. 182-196, Berlin, Germany.

F. Biocca, "Human-Bandwidth and the Design of Internet2 Interfaces: Human Factors and Psychosocial Challenge," Internet Sociotechnical Summit, 2000, pp. 67-80.

Pozgaj et al., "The Impact of Web 2.0 Services on Informal Education," MIPRO, May 24-28, 2010, pp. 944-948, Opatija, Croatia.

Popescu, "Dynamic Adaptive Hypermedia Systems for e-Learning," Doctorat TIS Universite de Craiova Roumanie, Nov. 15, 2008, 227 pages.

List of IBM Patents or Patent Applications Treated as Related.

* cited by examiner

200A

| INTENTIONAL USER FEEDBACK DATA ||||| 
|---|---|---|---|---|
| User | Component | FB# | Gesture | FB |
| U1 | 1 | 1 | 1 | - |
| U1 | 1 | 2 | 1 | - |
| U2 | 1 | 1 | 2 | + |

| GESTURE CLASSIFICATION RULES ||
|---|---|
| Gesture | Description |
| 1 | Tap Soft |
| 2 | Tap Strong |
| 3 | Slide Left |
| 4 | Slide Right |
| 5 | Zoom Horizontal |
| 6 | Zoom Vertical |
| 7 | Zoom Horizontal/Vertical |

| \multicolumn{3}{c}{RULES TO CLASSIFY GESTURES PER PROFILE} | | |
| --- | --- | --- |
| Profile | Gesture | Meaning |
| P1 | 1 | Like |
| P1 | 2 | Dislike |
| P2 | 1 | Neutral |
| P2 | 2 | Distress |

| \multicolumn{2}{c}{USER PROFILE DATA} | |
| --- | --- |
| User | Profile |
| U1 | P1 |
| U2 | P1 |
| U3 | P2 |
| U4 | P3 |

| EVALUATION OF USER FEEDBACK RESULTS AND GESTURES PER USER PER COMPONENT ||||
|---|---|---|---|
| User | Component | FB# | Gesture Evaluation |
| U1 | 1 | 1 | + |
| U1 | 1 | 2 | - |
| U2 | 1 | 1 | 0 |

| EVALUATION PER COMPONENT PER USER |||
|---|---|---|
| User | Component | Component Evaluation |
| U1 | 1 | + |
| U1 | 2 | + |
| U2 | 1 | 0 |

| GROUP PROFILE DATA ||
|---|---|
| Group | Profile |
| G1 | P1 |
| G2 | P1 |
| G3 | P2 |
| G4 | P3 |

| EVALUATION PER COMPONENT PER GROUP OF USERS |||
|---|---|---|
| Group | Component | Component Evaluation |
| G1 | 1 | + |
| G1 | 2 | - |
| G2 | 1 | 0 |

| NON-INTENTIONAL USER FEEDBACK DATA | | |
|---|---|---|
| User | Component | Gesture |
| U1 | 1 | 1 |
| U1 | 1 | 1 |
| U2 | 1 | 2 |

| EVALUATION OF USER FEEDBACK RESULTS AND GESTURES PER USER PER COMPONENT | | |
|---|---|---|
| User | Component | Gesture Evaluation |
| U1 | 1 | + |
| U1 | 1 | - |
| U2 | 1 | 0 |

| COMPOSITION RULE PER COMPONENT ||
|---|---|
| RULE | Component |
| R1 | 1 |
| R2 | 2 |
| R2 | 3 |
| R3 | 4 |

| COMPONENT EVALUATION PER COMPOSITION RULE |||
|---|---|---|
| Component | Rule | Evaluation |
| 1 | R1 | + |
| 2 | R2 | - |
| 3 | R2 | - |

FIG. 18

| COMPOSITION RULES | | | |
|---|---|---|---|
| RULE | Component | GROUP RROFILE | WEIGHT |
| R1 | 1 | A | 0.2 |
| R2 | 1 | B | 0.5 |
| R1 | 2 | A | 0.1 |
| R1 | 2 | B | 0.8 |
| R2 | 2 | A | 0.3 |

EVALUATION OF DIGITAL CONTENT USING INTENTIONAL USER FEEDBACK OBTAINED THROUGH HAPTIC INTERFACE

CROSS-REFERENCE TO RELATED APPLICATION

This application is a Continuation of U.S. patent application Ser. No. 14/283,393, filed on May 21, 2014, the disclosure of which is incorporated herein by reference.

TECHNICAL FIELD

The field generally relates to data processing and, in particular, to systems and methods for evaluating the quality of automatically composed digital content based on user feedback obtained through a haptic interface.

BACKGROUND

In general, a haptic interface is a system that enables individuals to interact with a computing system through bodily movements, tactile feedback and bodily sensations to perform actions or processes on a computing device. A haptic interface is primarily implemented and applied in virtual reality environments, where an individual can interact with virtual objects and elements. A haptic interface relies on sensors that send signals to the computer based on different sensory movements or interactions by the user. These sensor signals are processed by the computing system to initiate and execute a process or action. Haptic technology is utilized in various types of applications and computing systems.

SUMMARY

Embodiments of the invention generally include systems and methods for evaluating the quality of automatically composed digital content based on user feedback obtained through a haptic interface.

In one embodiment of the invention, a method is provided for processing data. The method includes accessing intentional user feedback collected by a haptic interface executing on a computing device, wherein the intentional user feedback provides an indication as to a user's reaction toward digital content that the user interacts with on the computing device. The digital content includes content that is automatically generated using content generation rules. The method further includes evaluating a quality of the digital content based on the intentional user feedback, and generating an evaluation report that includes information providing an evaluation of the quality of the digital content.

Other embodiments of the invention will be described in the following detailed description of embodiments, which is to be read in conjunction with the accompanying drawings.

DESCRIPTION OF THE DRAWINGS

FIG. 3 illustrates a data structure in the form of a table that includes various fields for storing intentional user feedback data, according to an embodiment of the invention.

FIG. 4 illustrates a data structure in the form of a table that includes various fields for storing information regarding a classification of gestures, according to an embodiment of the invention.

FIG. 5 illustrates a data structure in the form of a table which includes rules to classify gestures on a per profile basis, according to an embodiment of the invention.

FIG. 6 illustrates a data structure in the form of a table which includes various fields to store a classification of user profiles, according to an embodiment of the invention.

FIG. 7 illustrates a data structure in the form of a table which includes various fields to store computed user feedback results and associated gestures, grouped per user, for components of digital content, according to an embodiment of the invention.

FIG. 8 illustrates a data structure in the form of a table which includes various fields to store results of component evaluation, according to an embodiment of the invention.

FIG. 9 illustrates a data structure in the form of a table which includes various fields to store group profile data, according to an embodiment of the invention.

FIG. 10 illustrates a data structure in the form of a table which includes various fields to store information related to evaluation results for each component on a per group basis, according to an embodiment of the invention.

FIG. 13 illustrates a data structure in the form of a table which includes various fields for storing non-intentional user feedback data, according to an embodiment of the invention.

FIG. 14 illustrates a data structure in the form of a table which includes various fields to store information regarding the evaluation results for non-intentional gestures per user per component, according to an embodiment of the invention.

FIG. 17 illustrates a data structure in the form of a table which includes various fields to store composition rules that are applied to generate each component of digital content being analyzed, according to an embodiment of the invention.

FIG. 18 illustrates a data structure in the form of a table which includes various fields to store an overall evaluation of each component per a composition rule applied to the component, according to an embodiment of the invention.

FIG. 19 illustrates a data structure in the form of a table of composition rules comprising fields to store information regarding a list of composition rules, classified by weight, per group profile, for specific components of digital content, according to an embodiment of the invention.

DETAILED DESCRIPTION

Figure 1:
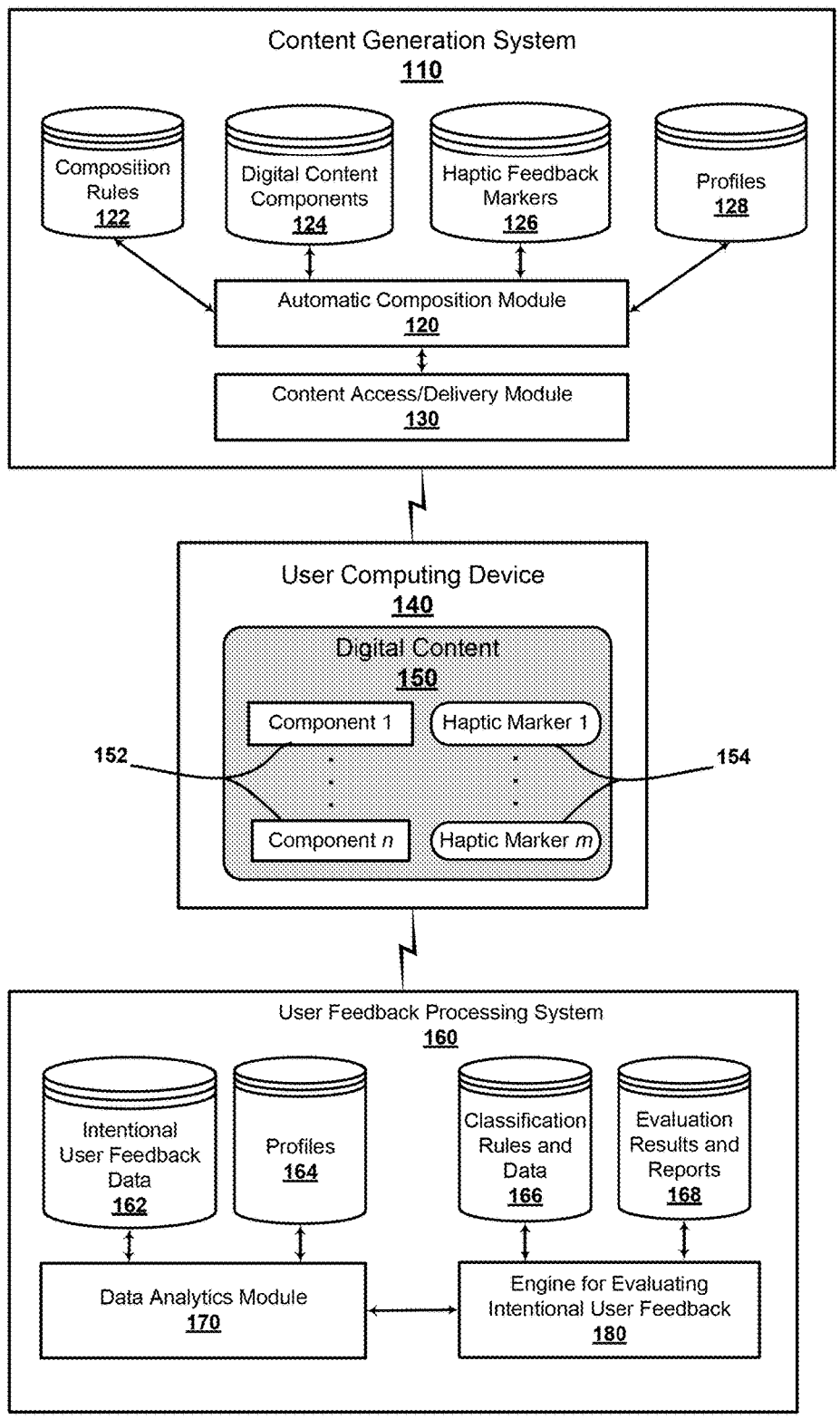
FIG. 1 is a block diagram of a system for evaluating the quality of digital content based on user feedback obtained through a haptic interface, according to an embodiment of the invention.

FIG. 1 is a block diagram of a system for evaluating quality of digital content based on user feedback obtained through a haptic interface, according to an embodiment of the invention. In particular, FIG. 1 illustrates a system 100 for evaluating digital content based on intentional user feedback obtained through user interaction with haptic feedback markers that are included in digital content, according to an embodiment of the invention. In general, the system 100 of FIG. 1 comprises a content generation system 110 which comprises an automatic composition module 120, and a content access and delivery module 130. The system 100 further comprises a computing device 140 that is configured to communicate with content generation system 110 over a computer network (e.g., wireless and/or wired LAN or WAN, global computer network (e.g., Internet), etc.) to access digital content 150 that is generated and delivered by the content generation system 110. The user computing device 140 executes an application that is configured to render and present the digital content 150 that is generated and delivered by the content generation system 110, and to collect intentional user feedback through user interaction with haptic feedback markers that are included in the digital content. The system 100 further comprises a user feedback processing system 160 comprising a data analytics module 170 and an intentional user feedback evaluation engine 180, which are configured to process intentional user feedback data that is captured and collected by the computing device 140, and evaluate the quality of the digital content 150 based on the intentional user feedback and other information, as will be discussed in further detail below.

The content generation system 110 is configured to automatically generate digital content for a given type of application. In particular, the automatic composition module 120 is configured to automatically generate digital content (e.g., digital educational material) using a data store of composition rules 122, a data store of digital content components 124, a data store of haptic feedback markers 126, and a data store of profile information 128. In one embodiment of the invention, the content generation system 110 is configured to generate digital educational content, which can be accessed and utilized by group of students for a given educational subject. While embodiments of the invention can be implemented with other types of digital content, for illustrative purposes, exemplary embodiments of the invention will be discussed in the context of digital education material.

The composition rules 122 provide a set of rules for composing digital content using a set of digital content components 124 (e.g., multimedia components). In general, the composition rules 122 specify what material is to be presented and how the material is to be constructed, positioned, and otherwise presented when rendered on a computing device. For example, the composition rules 122 may specify that a given picture be displayed on a given page with a certain description, wherein the picture is displayed at a given size and the text description displayed in a given font and size, etc. Methods for automatically constructing digital content based on composition rules are well known in the art and, thus, a detailed explanation of the content generation process is not necessary for understanding embodiments of the invention.

The automatic composition module 120 applies profile information 128 to guide the composition process and generate digital content that is customized for a target individual or a target group of individuals. For example, the profile information 128 comprises individual profile information for various types of individuals and group profile information for a given target social setting (e.g., groups of students, the way the student are disposed in classes, parameters related to their social relationships, etc.). The profile information 128 is utilized in conjunction with the composition rules 122 to customize the content generation (e.g., educational content) for a given individual or a target group of individuals (e.g. schools in a given region, individual schools, classrooms, other group formation, etc.) based on the profile information associated with the given individual or target group of individuals. For example, the composition rules may specify what specific digital content components 124 should be used to generate digital content for delivery to a specific individual or group of individuals based on various factors including, but not limited to, their demographics, gender, ages, etc.

The pages of digital content 150 are generated using various content components 152 (included in the data store of content components 124) along with one or more haptic feedback markers 154 (included in the data store of haptic feedback markers 126). The haptic feedback markers 126 include various interaction components, such as like/dislike buttons, check lists, and other types of interaction elements, which implement a haptic interface that allows a user to provide feedback as to whether the user likes or dislikes a given content component within a given page of the digital content 150, which is accessed and viewed by the user. The haptic feedback markers 126 are customized for the given haptic interface and contextualized within pages of the digital content 150.

The content access and delivery module 130 is configured to enable individual users or groups of users to register with the content generation system 110, provide relevant profile information, and download digital content (either push or pull) that is automatically generated by the content generation system 110. The content access and delivery module 130 can be implemented using known front-end API techniques for accessing and interacting with web applications, for example The content access and delivery module 130 is configured to communicate with the user computing device 140 and deliver pages of digital content 150 for rendering and presentation to a user.

The user computing device 140 is may be any type of computing device, such as a desktop computer, electronic tablet, smart phone, etc. which is configured to execute an application to render and present pages of the digital content 150 and to provide a haptic interface to collect intentional user feedback resulting from user interaction with haptic feedback markers that are presented within the rendered content pages. As shown in FIG. 1, the digital content 150 comprises a rendered content pages that comprises a plurality of n content components 152 (Component 1, . . . , Component n), and a plurality of m haptic feedback markers 154 (Haptic Marker 1, . . . , Haptic Marker m). It is to be understood that while FIG. 1 shows a single user computing device 140, the same digital content 150 can be downloaded to a plurality of computing devices that are used by different individuals within a given group (e.g., a plurality of students within a given classroom studying a given topic such as History). As an individual or group of individuals review and interact with pages of the digital content 150 presented on their respective computing device 140, the individual(s)

can provide intentional feedback regarding their opinion on the quality of the digital content 150 (e.g., feedback regarding particular components 152) through interaction with the haptic feedback markers 154.

The user computing device 140 comprises a haptic interface which captures and stores the user interaction events with the haptic feedback markers 154 for access by the user feedback processing system 160. In general, the user feedback processing system 160 implements methods to collect, index, group, and analyze the distinct characteristics of the intentional user interaction with haptic feedback markers, and correlate such information to individual profiles of the users and social setting information (e.g. the groups of students, the way they are disposed in classes, and parameters related to their social relationships). The process generates a report of summarized group reaction towards the generated digital content in terms of organization of memory and learning, focus and attention, perception, categorization and preference, motivation and performance, learning, and others factors. The report can be utilized to evaluate the quality of the digital content 150, and thus validate the quality of the composition rules 122 being applied to generate digital content.

Overall, the system 100 of FIG. 1 implements a protocol to validate the process of automated composition of digital content by providing methods to validate the parameters being applied by the composition rules. This process leads to possible reconsideration, optimization and adjustment of parameters of the composition rules with the goal of continually improving the content generation process through subjective evaluation of composition rules by analyzing the intentional feedback input obtained through the haptic feedback markers inserted in the digital content during the composition phase.

In the user feedback processing system 160, the data analytics module 170 receives the user interaction events (e.g., interaction with the haptic interface) from the computing device 140, and stores, indexes and aggregates the interaction events in the form of intentional user feedback data that is maintained in a data store of intentional user feedback data 162. The data analytics module 170 further maintains a data store of profile information 164, which includes profile information maintained in the data store of profile information 126 utilized in the content generation system 110.

The intentional user feedback evaluation engine 180 utilizes a data store of classification rules and data 166 to process the intentional user feedback data 162 and profile data 164 provided by the data analytics module 170 and generate information that is stored and maintained in a data store of evaluation results and reports 168. The intentional user feedback evaluation engine 180 compiles distinct features of intentional user feedback obtained through haptic feedback markers 154 within pages of digital content 150 and the group behavior towards the digital content 150, which is maintained and stored in the data store of intentional user feedback data 162. The intentional user feedback evaluation engine 180 correlates this information to the profile data 164 and social setting information used by the composition rules 122 to generate reports of summarized group reaction towards the generated digital content in terms of, e.g., organization of memory and learning, focus and attention, perception, categorization and preference, motivation and performance, learning, and other factors.

As noted above, embodiments of the invention can be implemented in the context of digital educational material. For example, assume that a private school implements an educational program to deliver digital educational content to its students. In the context of the system 100 of FIG. 1, the digital educational content is generated by the content generation system 110. In this embodiment, the digital content components 124 would include various components of digital educational material related to one or more subjects. The automatic composition module 120 would compose the digital educational content using relevant composition rules 122 and profile information 128 to create customized educational material for the students based on profiles of the individual students and based on their social setting (e.g., the groups of students, the way the students are disposed in classes, and parameters related to their social relationships). Moreover, the automatic composition process would insert one or more relevant haptic feedback markers 126 within the digital educational material to provide an interface for the students to intentionally evaluate content components 124 of the digital educational content pages.

The digital educational content is delivered to computing devices that are used by the students to access and view the digital educational content. For example, the students within a given classroom could use electronic tablet computing devices or laptop computers, which would have an application for accessing and rendering the digital educational content, as well as a haptic interface for processing user feedback provided by user interaction haptic feedback markers that are displayed or otherwise rendered on pages of the digital educational content pages. For example, a student could click on a given region on a screen display of a haptic interface or upon a specific portion of displayed digital education material to open a feedback input screen where the student can make a selection. It is expected that a variation in context, such as the individual's profile and social setting, will influence how the individual interacts with the haptic feedback markers. For example, individuals of different ages and/or from diverse socio, educational, and cultural backgrounds (e.g. level of education, previous knowledge about the content, social pressures, education environment, etc.) will interact with the haptic interface distinctively, e.g., an elderly person either being more precise and soft while pushing a positive feedback button or being more "aggressive" in the same movement for negative feedback due to distress.

The haptic interface executing on the user computing device 140 registers the intentional user feedback being input as well interaction information with regard to how individual interacts with the haptic feedback markers 154. This interaction information may include, for example, a position where the user taps on a screen surface in a region of a haptic interface, the tap pressure, finger movements upon the feedback markers, and other types of interaction information that would provide a unique signature of the intentional feedback by an individual. Such information could be indicative of the individual's distress, anxiousness, satisfaction or some other feeling toward certain content, which can be used to further evaluate the individual's interaction with the digital educational material. For instance, a user can select a "like" button (haptic feedback marker) to provide intentional feedback regarding the user's satisfaction with certain digital content. If the user taps hard on the "like" button (high pressure tap on interactive screen), this can be indicative of the user being highly satisfied with the given digital content.

These feedback events are registered and processed by the data analytics module 170 in the user feedback processing system 160. The intentional user feedback evaluation engine 180 implements statistical analysis methods to cross-relate the intentional user feedback data 162 and the profile data 164 to generate utilization reports that summarize intentional reactions from the group of students towards the digital educational content in terms of organization of memory and learning, focus and attention, perception, categorization and preference, motivation and performance, learning, and other factors. Thereafter, system administrators, educators, and/or other individuals can apply this information to manually fine-tune the parameters in the composition rules 122 that are applied to generate the digital educational content for the specific target group of students. By repeating this process, the quality of the digital educational content being provided to the students can be improved over time.

Figure 2:
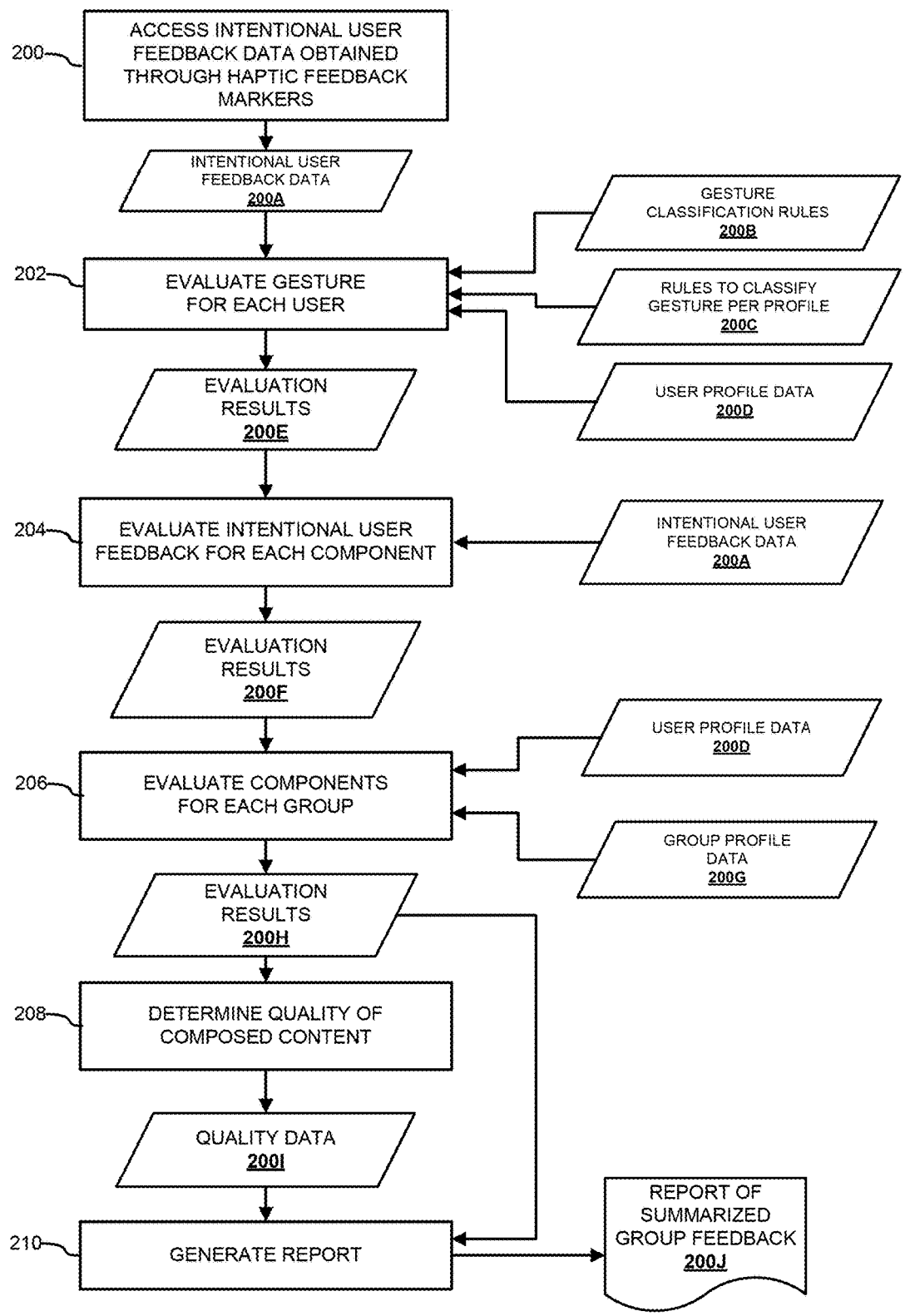
FIG. 2 is a flow diagram that illustrates a method for automatic evaluation of intentional user feedback obtained through a haptic interface, according to an embodiment of the invention.

FIG. 2 is a flow diagram that illustrates a method for automatic evaluation of intentional user feedback obtained through a haptic interface, according to an embodiment of the invention. In one embodiment of the invention, FIG. 2 illustrates a process flow implemented by the intentional user feedback evaluation engine 180 of FIG. 1. Therefore, for purposes of illustration, the method of FIG. 2 will be discussed in the context of the system of FIG. 1. An initial step in the process flow includes accessing relevant intentional user feedback data obtained through interaction with haptic feedback markers (block 200). For example, as depicted in FIG. 2, the intentional user feedback evaluation engine 180 will obtain intentional user feedback data 200A from the data analytics module 170, which collects the registers of intentional user feedback information received from the computing device 140.

Next, the intentional user feedback evaluation engine 180 executes a method to evaluate each gesture on a per user basis (block 202). For this process, the intentional user feedback evaluation engine 180 uses the intentional user feedback data 200A, as well as gesture classification rules 200B, rules to classify gestures per profile 200C, and user profile data 200D. This process generates evaluation results 200E that provide an evaluation of the feedback results and gestures per user per component. This process will be further explained with reference to the data structures shown in FIGS. 3, 4, 5, 6 and 7.

FIG. 3 illustrates a data structure comprising intentional user feedback data, according to an embodiment of the invention. In particular, FIG. 3 illustrates a data structure 200A in the form of a table that includes various fields for storing intentional user feedback data. The fields include a User index (User), a Component index (Component), a Feedback index (FB#), a Gesture index (Gesture), and user feedback information (FB). The User index provides an index number for each of a plurality of users (e.g., user U1 and user U2). The Component index lists an index for a given component (e.g., Component 1). The Feedback index (FB#) provides an index for each feedback provided by a given user for a given component. For example, FIG. 3 shows that a first user U1 provided feedback for Component 1 on two separate occasions. The Gesture index provides an index that identifies the given gesture (as explained below in FIG. 4). The feedback information (FB) identifies the user's subjective feeling toward the given component. For example, a negative feedback is represented by the symbol "−" while a positive feedback is represented by the symbol "+". Accordingly, the intentional user feedback information 200A comprises, among others, a listing of each user's input per component, along with associated gesture, which is collected and organized by the data analytics module 170.

FIG. 4 illustrates a data structure comprising gesture classification rules, according to an embodiment of the invention. In particular, FIG. 4 illustrates a data structure 200B in the form of a table that includes various fields for storing information regarding a basic classification of gestures. The fields include a Gesture index field and a Description field. The Gesture index field provides an index number for each of a plurality of different gestures that a user may make while interacting with digital content components or associated haptic feedback markers. For example, as shown in FIG. 1, a "Tap Soft" gesture is assigned an index of 1, while a "Tap Strong" gesture is assigned an index of 2. As noted above, a haptic interface may include a pressure sensor to determine an amount of pressure that is applied to the display screen when a user is selecting a given element that is displayed on the screen. The magnitude of the force that the user applies to the screen is information that can be indicative of the user's feeling in making the selection.

FIG. 5 illustrates a data structure comprising rules to classify gestures on a per profile basis, according to an embodiment of the invention. In particular, FIG. 5 illustrates a data structure 200C in the form of a table that includes various fields for storing information to cross-relate the basic classification of gestures (in Table 200B) with the "meaning" of the gestures for specific user profiles. The fields include a Profile index field, a Gesture index field, and a Meaning field. The Profile index field lists a given predefined user profile (e.g., P1, P2, etc.). The Gesture index field provides an index number for a given gesture as classified in table 200B of FIG. 4. The Meaning field specifies the meaning of the given gesture by a user having the given profile. For example, as shown in FIG. 5, for a user having a profile of P1, it is assumed that Gesture 1 (e.g., Tap Soft) would provide an indication of the user's satisfaction (like) with given content, while the Gesture 2 (e.g., Tap Strong) would provide an indication of the user's dislike of the given content.

FIG. 6 illustrates a data structure comprising user profile data, according to an embodiment of the invention. In particular, FIG. 6 illustrates a data structure 200D in the form of a table that includes various fields to store a classification of user profiles based on information such as demographics, socio-cultural background, education background, historic of manipulation of haptic interface content, and/or other information. The fields include a User index field and a Profile index field. The column of User index fields provides a listing of each of a plurality of users (e.g., U1, U2, U3, U4 . . . ). The column of Profile index fields provides a user profile (e.g., P1, P2, P3) that is assigned to each User index. For example, in table 200D, users U1 and U2 are assigned the same profile P1, while users U3 and U4 are assigned profiles P2 and P3, respectively.

Referring back to FIG. 2, the information within tables 200A, 200B, 200C, and 200D is processed by the intentional user feedback evaluation engine 180 (in block 202) to generate the evaluation results 200E shown in FIG. 7. In particular, FIG. 7 shows a table data structure 200E having various fields to store the computed feedback results and the gestures used to select the associated user feedback, grouped per user, for the interaction to each component of the digital content. The fields include the same User index field, the Component field, and feedback index field (FB#) included in the data structure 200A shown in FIG. 3, as well as Gesture Evaluation field. In FIG. 7, the Gesture Evaluation field specifies the evaluation results as +, − or 0 symbols, wherein + denotes like, − denotes dislike, and 0 denotes neutral.

Next, the intentional user feedback evaluation engine 180 executes a method to evaluate the user feedback on a per component basis (block 204). For this process, the intentional user feedback evaluation engine 180 uses the evaluation results 200E (FIG. 7) and the intentional user feedback data 200A (FIG. 3) to generate evaluation results 200F that provide a user evaluation of each component in the digital content. The process (block 204) cross-relates the evaluation results 200E with the intentional user feedback data 200A (FIG. 3) to generate the evaluation results 200F shown in FIG. 8. In particular, FIG. 8 shows a table data structure 200F having various fields to store the results of the component evaluation. The fields include the same User index field and the Component field as shown in FIG. 3, as well as Component Evaluation field. In FIG. 8, the Component Evaluation field specifies the evaluation results as +, − or 0 symbols, wherein + denotes like, − denotes dislike, and 0 denotes neutral.

Referring back to FIG. 2, as a next step in the process, the intentional user feedback evaluation engine 180 executes a method to evaluate each component on a per group basis (block 206). For this process, the intentional user feedback evaluation engine 180 uses the evaluation results 200F (FIG. 8), the user profile data 200D (FIG. 6), as well as group profile data 200G (shown in FIG. 9), to thereby generate evaluation results 200H (FIG. 10). The process (block 206) cross-relates the evaluation results 200F with user profile data 200D (FIG. 6) and group profile data 200G (FIG. 9) to generate the evaluation results 200H (FIG. 10).

FIG. 9 illustrates a data structure comprising group profile data, according to an embodiment of the invention. In particular, FIG. 9 illustrates a data structure 200G in the form of a table that includes various fields to store a classification of group profiles, wherein the group profiles are generated by combining information of individuals in a group based on information contained in the user profile data table 200D (FIG. 6). The fields include a Group index field and a Profile index field. The column of Group index fields provides a listing of each of a plurality of groups of users (e.g., G1, G2, G3, G4 . . . ). The column of Profile index fields includes user profiles (e.g., P1, P2, P3) that are assigned to each Group index. For example, groups G1 and G2 are specified to include information regarding user profile P1, while groups G3 and G4 are specified to include information regarding user profiles P2 and P3, respectively.

FIG. 10 shows a table data structure 200H having various fields to store information related to the evaluation results for each component on a per group basis. The fields include the Group index field, the Component index field, and corresponding Component Evaluation results field. In FIG. 10, the Component Evaluation field specifies the evaluation results as +, − or 0 symbols, wherein + denotes like, − denotes dislike, and 0 denotes neutral. For example, FIG. 10 illustrates that a group of users with group profile G1 tend to like the Component 1, but tend to dislike Component 2.

Referring back to FIG. 2, as a next step in the process, the intentional user feedback evaluation engine 180 uses the evaluation results 200H to determine a quality of the composed digital content (block 208). With this process, the intentional user feedback evaluation engine 180 executes method to determine an overall rating for the composed digital content considering the evaluation results 200H to generate quality data 200I. The quality data 200I provides a rating of the quality of the composed digital content, e.g., Low, Averages, Good, etc.

The intentional user feedback evaluation engine 180 then executes a report generating process (block 210) to generate a report 200J using the quality data 200I and the evaluation results 200H. In one embodiment of the invention, the report 200J summarizes the information provided by the quality data 200I and the determined group evaluations per component as set forth in the evaluation results 200H. Thereafter, the report 200J can be utilized by system administrators, educators, and other parties to evaluate the quality of the digital content, thus validating the quality of the composition rules 122 that are used to generate the digital content. If desired, the system administrator, etc., can manually modify the composition rules 122 with the goal of improving the quality of the digital content being generated by the automated content generation process to specific individuals or specific groups of individuals, etc.

Figure 11:
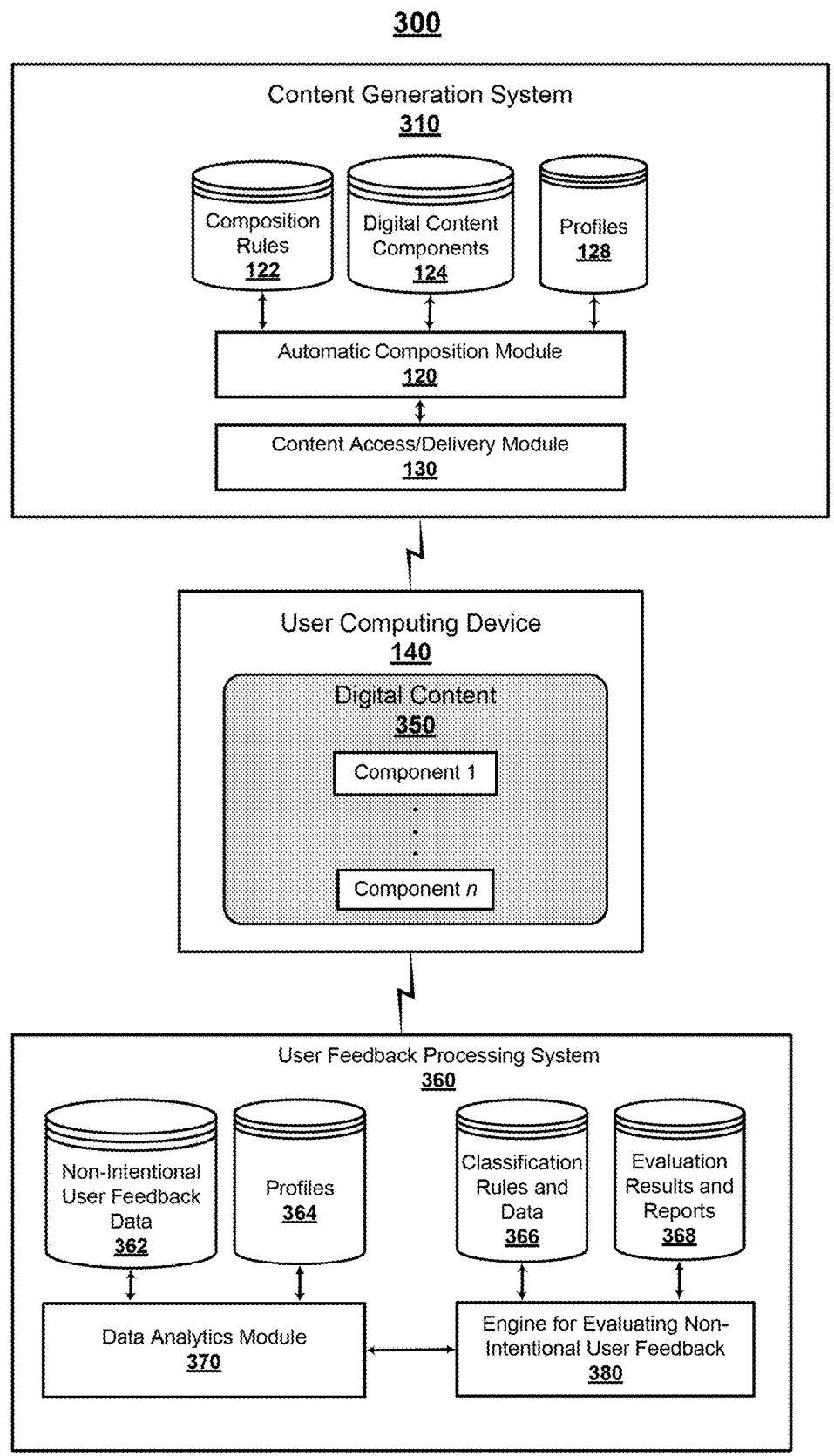
FIG. 11 is a block diagram of a system for evaluating the quality of digital content based on user feedback obtained through a haptic interface, according to another embodiment of the invention.

FIG. 11 is a block diagram of a system for evaluating quality of digital content based on user feedback obtained through a haptic interface, according to another embodiment of the invention. In particular, FIG. 11 illustrates a system 300 for evaluating digital content based on non-intentional user feedback obtained through user interaction with digital content, according to an embodiment of the invention. In general, the system 300 of FIG. 11 comprises a content generation system 310 which is similar to the content generation system 110 discussed above with reference to FIG. 1. However, the content generation system 310 in FIG. 11 does not include a data store of haptic feedback markers 126 (as shown in FIG. 1). Instead, in the embodiment of FIG. 11, the content generation system 310 generates digital content 350 which comprises a plurality of components (e.g., Component 1, . . . Component n) using methods as discussed above, but without specific haptic feedback markers as included in the digital content 150 shown in FIG. 1.

The system 300 of FIG. 11 provides for non-subjective evaluation of automatically generated digital content (e.g., education material) based on non-intentional signals obtained through a haptic interface implemented by the user computing device 140. The user computing device 140 in this embodiment comprises a haptic interface that is configured to capture and collect non-intentional signals generated by user manipulation of the digital content 350. The non-intentional signals include, for example, finger interaction with components of the digital content 350 such as gestures, tactile manipulation, contact, zooming actions, tapping, and others interactions. The user computing device 140 outputs this information as utilization events to a user feedback processing system 360.

In the exemplary embodiment of FIG. 11, the user feedback processing system 360 implements methods to collect, index, group, and analyze the distinct characteristics of the non-intentional user interaction with components of the digital content 350, and then correlate this information to individual user profiles and social setting information (e.g. the groups of students, the way they are disposed in classes, and parameters related to their social relationships). Similar to the system 100 of FIG. 1, the process of FIG. 11 generates a report of summarized group reaction towards the generated digital content in terms of organization of memory and learning, focus and attention, perception, categorization and preference, motivation and performance, learning, and others factors. In particular, the system 300 of FIG. 11 implements a protocol to validate the process of automated composition of digital content by providing methods to validate the parameters being applied by the composition rules based on non-intentional user feedback. This process leads to possible reconsideration, optimization and adjustment of parameters of the composition rules with the goal of continually improving the content generation process through non-subjective evaluation of composition rules through analyzing the non-intentional feedback input obtained through user interaction with components of the digital content via the haptic interface.

More specifically, in the user feedback processing system 360, a data analytics module 370 receives the user utilization events from the computing device 140, and stores, indexes and aggregates the utilization events in the form of non-intentional user feedback data that is maintained in a data store of non-intentional user feedback data 362. The data analytics module 370 further maintains a data store of profile information 364, which comprises information that is maintained in the data store of profile information 126 utilized in the content generation system 310.

A non-intentional user feedback evaluation engine 380 utilizes a data store of classification rules and data 366 to process the non-intentional user feedback data 362 and profile data 364 provided by the data analytics module 370 and generate information that is stored and maintained in a data store of evaluation results and reports 368. The non-intentional user feedback evaluation engine 380 compiles distinct features of non-intentional user feedback obtained through user interaction and manipulation of components of the digital content via the haptic interface, and group behavior towards the digital content 350. The non-intentional user feedback evaluation engine 380 correlates this information to the profile data 364 and social setting information used by the composition rules 122 to generate reports of summarized group reaction towards the generated digital content in terms of, e.g., organization of memory and learning, focus and attention, perception, categorization and preference, motivation and performance, learning, and other factors.

As noted above, embodiments of the invention can be implemented in the context of digital educational material. An illustrative scenario for processing non-intentional user feedback signals is similar to that discussed above with regard to a private school that implements an educational program to deliver digital educational content to its students. In this example, the educational digital content is delivered to students who interact and manipulate the digital content while viewing the content on a laptop computer or electronic tablet, for example. A haptic interface executing on the computing device 140 of each student registers non-intentional signals generated by the manipulation of the digital educational material, such as tactile manipulation, gesture, the way students tap upon specific components, the components that students zoom in on, and give more attention to, time to change pages, clicks on hyperlinks for alternative content, and others types of interaction. In this scenario, it is expected that variation of context, such as end-users' profile and social setting, will influence on how the end-user interacts with the digital educational material. For example, a student in distress and/or with previous knowledge of the content being presented, will tend to turn the pages faster and avoid zooming in on specific parts. Whereas, students with interest and no previous knowledge of the content will interact with more elements, stay longer in specific pages, and so on.

These non-intentional user feedback events are acquired and registered by the data analytics module 370 as non-intentional user feedback data 362. The non-intentional user feedback evaluation engine 380 implements methods to cross-relate the non-intentional user feedback data 362 derived from (i) the student's non-intentional signals acquired through the manipulation of the digital educational material via the haptic interface, and Digital Content Material through the Haptic Interface, and (2) the profile data of the students. The non-intentional user feedback evaluation engine 380 generates utilization reports that summarize non-intentional signals from groups of student towards the generated digital educational material in terms of organization of memory and learning, focus and attention, perception, categorization and preference, motivation and performance, learning, and others. Thereafter, system administrators, educators, and other parties can apply this information to fine-tune the parameters in the composition rules 122 being applied to generate the digital educational material for the specific group of students. This process will continuously improve the quality of educational digital content being provided to the students over time.

Figure 12:
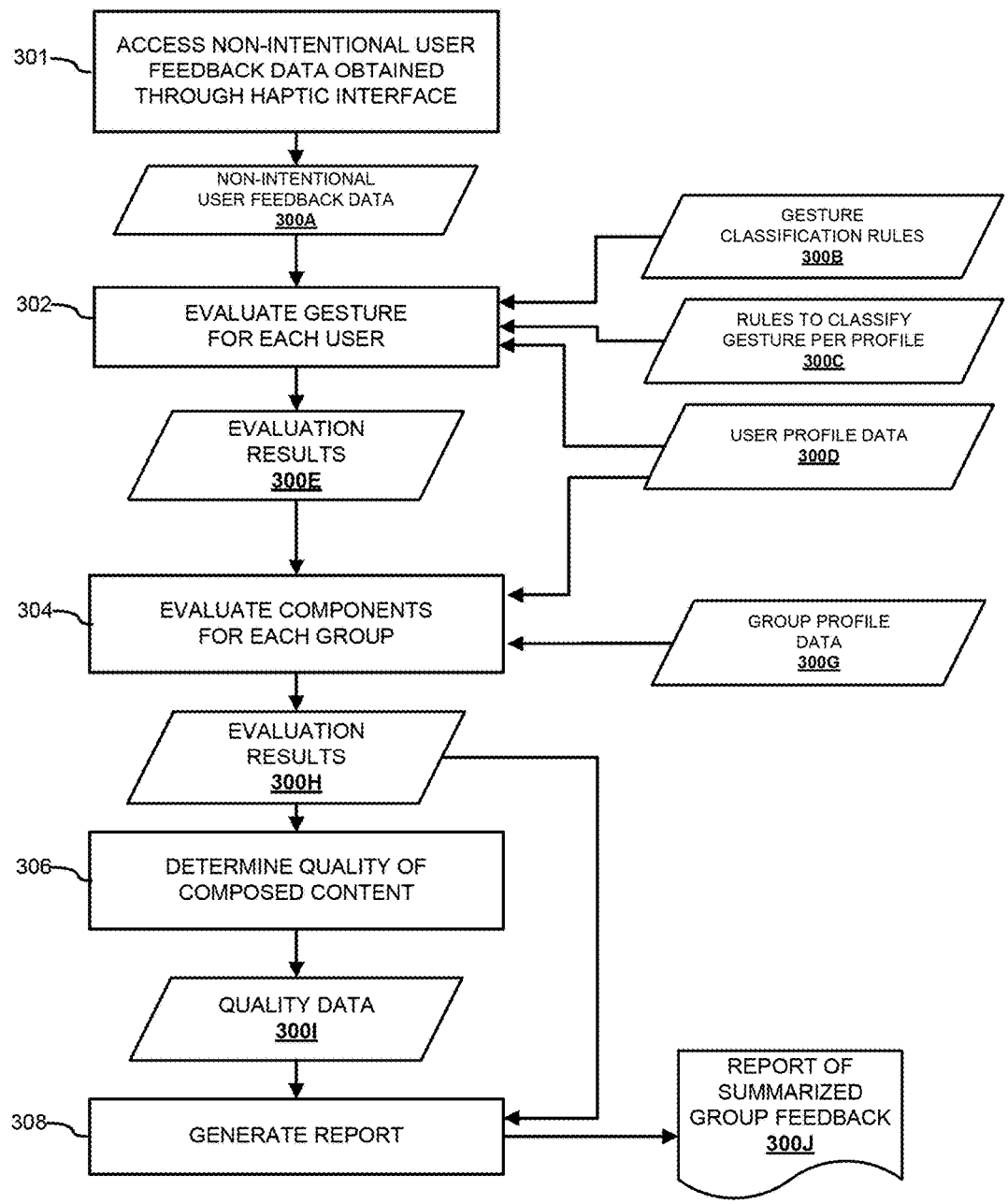
FIG. 12 is a flow diagram that illustrates a method for automatic evaluation of non-intentional user feedback obtained through a haptic interface, according to an embodiment of the invention.

FIG. 12 is a flow diagram that illustrates a method for automatic evaluation of non-intentional user feedback obtained through a haptic interface, according to an embodiment of the invention. In one embodiment of the invention, FIG. 12 illustrates a process flow implemented by the non-intentional user feedback evaluation engine 380 of FIG. 11. Therefore, for purposes of illustration, the method of FIG. 12 will be discussed in the context of the system 300 of FIG. 11. An initial step in the process flow includes accessing relevant non-intentional user feedback data obtained through interaction with a haptic interface (block 301). For example, as depicted in FIG. 11, the non-intentional user feedback evaluation engine 380 will obtain non-intentional user feedback data 300A from the data analytics module 370, which collects the registers of non-intentional user feedback information received from the computing device 140.

Next, the non-intentional user feedback evaluation engine 380 executes a method to evaluate each gesture on a per user basis (block 302). For this process, the non-intentional user feedback evaluation engine 380 uses the non-intentional user feedback data 300A, as well as gesture classification rules 300B, rules to classify gestures per profile 300C, and user profile data 300D. This process generates evaluation results 300E which provides an evaluation of the feedback results and gestures per user per component. This process will be further explained with reference to the data structures shown in FIG. 13, for example.

FIG. 13 illustrates a data structure comprising non-intentional user feedback data, according to an embodiment of the invention. In particular, FIG. 13 illustrates a data structure 300A in the form of a table that includes various fields for storing non-intentional user feedback data. The fields include a User index (User), a Component index (Component), and a Gesture index (Gesture). The User index provides an index number for each of a plurality of users (e.g., user U1 and user U2). The Component index lists an index for a given component (e.g., Component 1). The Gesture index provides an index that identifies the given gesture (non-intentional user feedback signal). Accordingly, the non-intentional user feedback information 300A comprises, among others, a listing of non-intentional feedback signals per user per component, which is collected and organized by the data analytics module 370. Moreover, example embodiments of the gesture classification rules 300B, rules to classify gestures per profile 300C, and user profile data 300D are similar to the data structures 200B, 200C and 200D shown in FIGS. 4, 5, and 6 and, therefore, a detailed discussion need not be repeated.

Referring back to FIG. 12, the information within tables 300A, 300B, 300C, and 300D is processed by the non-intentional user feedback evaluation engine 380 (in block 302) to generate the evaluation results 300E shown in FIG. 14. In particular, FIG. 14 shows a table data structure 300E having various fields to provide information regarding the evaluation results for the non-intentional gestures per user per component. The fields include the User index field, the Component field, and a Gesture Evaluation field. In FIG. 14, the Gesture Evaluation field specifies the evaluation results as +, − or 0 symbols, wherein + denotes like, − denotes dislike, and 0 denotes neutral.

Referring back to FIG. 2, as a next step in the process, the non-intentional user feedback evaluation engine 380 executes a method to evaluate each component on a per group basis (block 304). For this process, the non-intentional user feedback evaluation engine 380 uses the evaluation results 300E (FIG. 14), the non-intentional user feedback data 300A (FIG. 13), as well as user profile data 300D and group profile data 300G, to thereby generate evaluation results 300H. The process (block 304) cross-relates the non-intentional user feedback data 300A (FIG. 13) with the group profile data 300G (e.g., FIG. 9) to generate the evaluation results 300H. In one embodiment of the invention, the evaluation results 300H are similar in content and structure to the evaluation results 200H shown in FIG. 10 and, therefore, a detailed discussion need not be repeated.

Next, the non-intentional user feedback evaluation engine 380 uses the evaluation results 300H to determine a quality of the composed digital content (block 306). With this process, the non-intentional user feedback evaluation engine 380 executes method to determine an overall rating for the composed digital content considering the evaluation results 300H to generate quality data 300I. The quality data 300I provides a rating of the quality of the composed digital content, e.g., Low, Averages, Good, etc.

The non-intentional user feedback evaluation engine 380 then executes a report generating process (block 308) to generate a report 300J using the quality data 300I and the evaluation results 300H. In one embodiment of the invention, the report 300J summarizes the information provided by the quality data 300I and the determined group evaluations per component as set forth in the evaluation results 300H. Thereafter, the report 300J can be utilized by system administrators, educators, and other parties to evaluate the quality of the digital content, thus validating the quality of the composition rules 122 that are used to generate the digital content. If desired, the system administrators, etc., can manually modify the composition rules 122 with the goal of improving the quality of digital content material being generated by the automated content generation process.

Figure 15:
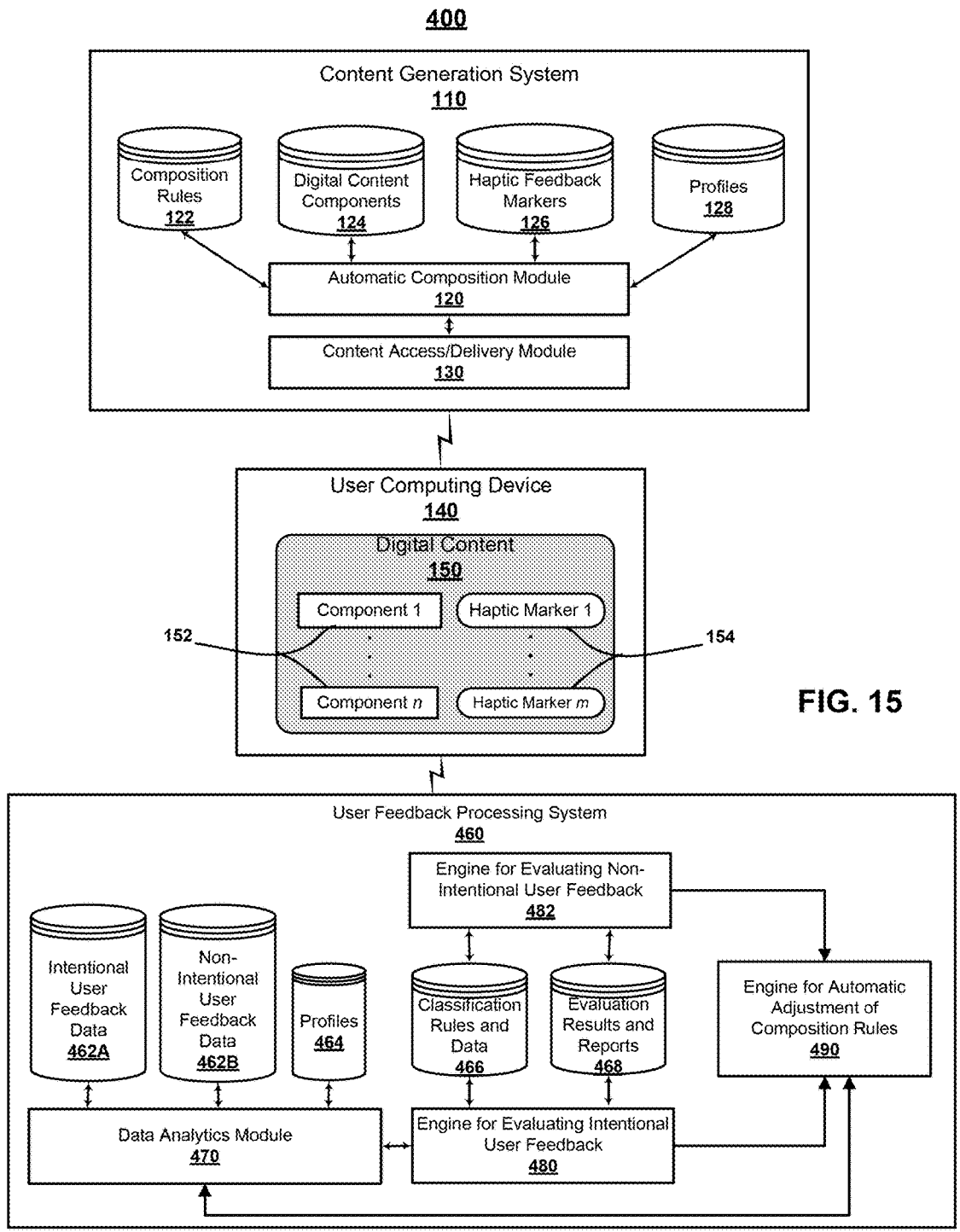
FIG. 15 is a block diagram of a system for evaluating the quality of digital content based on user feedback obtained through a haptic interface, according to yet another embodiment of the invention.

FIG. 15 is a block diagram of a system for evaluating the quality of digital content based on user feedback obtained through a haptic interface, according to yet another embodiment of the invention. In particular, FIG. 15 illustrates a system 400 for evaluating digital content based on a combination of intentional user feedback and non-intentional user feedback obtained through user interaction with digital content, according to an embodiment of the invention. The system 400 of FIG. 15 comprises a content generation system 110 which is similar to the content generation system 110 discussed above with reference to FIG. 1. The content generation system 110 in FIG. 15 includes a data store of haptic feedback markers 126 to generate digital content 150 having a plurality of components 152 and augmented with one or more haptic feedback markers 154 for implementing a haptic interface to collect intentional user feedback data based on user interaction with the haptic feedback markers 154, as discussed above with regard to FIGS. 1 and 2, for example.

The system 400 of FIG. 15 comprises a user feedback processing system 460 that is configured to process intentional user feedback data and non-intentional user feedback data, using techniques such as discussed above with reference to FIGS. 2 and 12, for example. More specifically, as shown in FIG. 15, the user feedback processing system 460 comprises a data analytics module 470, an intentional user feedback evaluation engine 480, a non-intentional user feedback evaluation engine 482, and an engine for automatic adjustment of composition rules 490. Similar to the embodiments of the systems 100 and 300 discussed with reference to FIGS. 1 and 11, for example, the data analytics module 470 receives the user interaction events from the computing device 140, and stores, indexes and aggregates the interaction events in the form of intentional user feedback data (obtained through user interaction with haptic feedback markers 154) which is maintained in a data store of intentional user feedback data 462A, as well as non-intentional user feedback data (obtained through user interaction with content components) which is maintained in a data storage of non-intentional user feedback data 462B. The data analytics module 470 further maintains a data store of profile information 464 (comprising user and group profile data).

For example, in the context of the above illustrative scenario where students interact with the digital educational content, a haptic interface of the computing device 140 captures intentional user feedback through the haptic feedback markers 154 and registers non-intentional user feedback signals generated by the manipulation of the digital educational material. Such non-intentional user feedback signals can be signals generated as a result of tactile manipulation, gesture, based on the manner in which students tap up specific displayed elements, the elements that students zoom in on and give more attention to, the time spent on certain content pages, clicks on hyperlinks for accessing alternative content, and others types of interactions of non-intentional user feedback indicative of an individual's reaction (interest or lack of interest, neutrality, etc.) towards digital content rendered by the computing device.

Again, as noted above, it is expected that the variation of context, such as an individual's profile and social setting, will influence on how the individual interacts with the digital educational content or other content. For example, an individual in distress and/or with previous knowledge of content being presented will tend to turn the pages faster and avoid zooming in on specific elements. Whereas, in individual with interest and no previous knowledge of the content will interact with more elements, stay longer on specific content pages, and so on. As a further example, individuals of different ages and from diverse socio, education, and cultural backgrounds (e.g. influenced by level of education, previous knowledge about the content, social pressures, education environment, etc.) will interact with the haptic interface (touch screen surface) distinctively—for example, an elderly person either being more precise and soft while pushing a positive feedback button or being more "aggressive" in the same movement expressing negative feedback due to distress.

The intentional user feedback evaluation engine 480 utilizes information within a data store of classification rules and data 466 to process the intentional user feedback data 462A and profile data 464 provided by the data analytics module 470 using methods discussed above with reference to FIG. 2, for example, to generate information that is stored and maintained in a data store of evaluation results and reports 468. In particular, as noted above, the intentional user feedback evaluation engine 480 generates reports of summarized group reaction towards the generated digital content based on the intentional user input data captured through haptic feedback markers and the group behavior towards the digital content.

The non-intentional user feedback evaluation engine 482 utilizes information within the data store of classification rules and data 466 to process the non-intentional user feedback data 462B and profile data 464 provided by the data analytics module 470 using methods discussed above with reference to FIG. 12, for example, to generate information that is stored and maintained in a data store of evaluation results and reports 468. In particular, as noted above, the non-intentional user feedback evaluation engine 482 generates reports of summarized group reaction towards the generated digital content based on non-intentional user feedback signals generated by the manipulation of the digital content through a haptic interface of a computing device.

The engine for automatic adjustment of composition rules 490 is configured to utilize information contained within evaluation reports generated by the intentional and non-intentional user feedback evaluation engines 480 and 482 to automatically adjust the composition rules 122 that are used to generate the digital content. In particular, as explained in further detail below, the engine for automatic adjustment of composition rules 490 implements methods to process and analyze the summary reports (e.g., reports 200J and 300J, FIGS. 2 and 12) showing group reaction towards the generated digital content based on (i) the intentional user feedback data obtained through the haptic feedback markers 154 (e.g. buttons, check lists, and other interaction elements in haptic interfaces) and (ii) the non-intentional user feedback data (e.g. gestures, tactile manipulation, contact, zooming actions, tapping, and others).

The engine 490 is configured to analyze and cross-relate the summary report information with parameters used by the composition rules 122 and the components 152 of the generated digital content 150. The engine 490 utilizes statistical analysis techniques to evaluate distinct characteristics of the interactions in the summary report information output from the evaluation engines 480 and 482, classifies their meaning, and infers the users' perception of the quality of the digital content in terms of organization of memory and learning, focus and attention, perception, categorization and preference, motivation and performance, learning, and others. The engine 490 applies advanced algorithms for optimization and machine learning to adjust the parameters utilized by the composition rules 122 with the goal of improving the quality of material being generated by this process. In this regard, the user feedback processing system 460 is configured to dynamically adjust and optimize the automated content composition process implemented by the content generation system 110 through the automatic optimization and adjustment of parameters of the composition rules 122.

Figure 16:
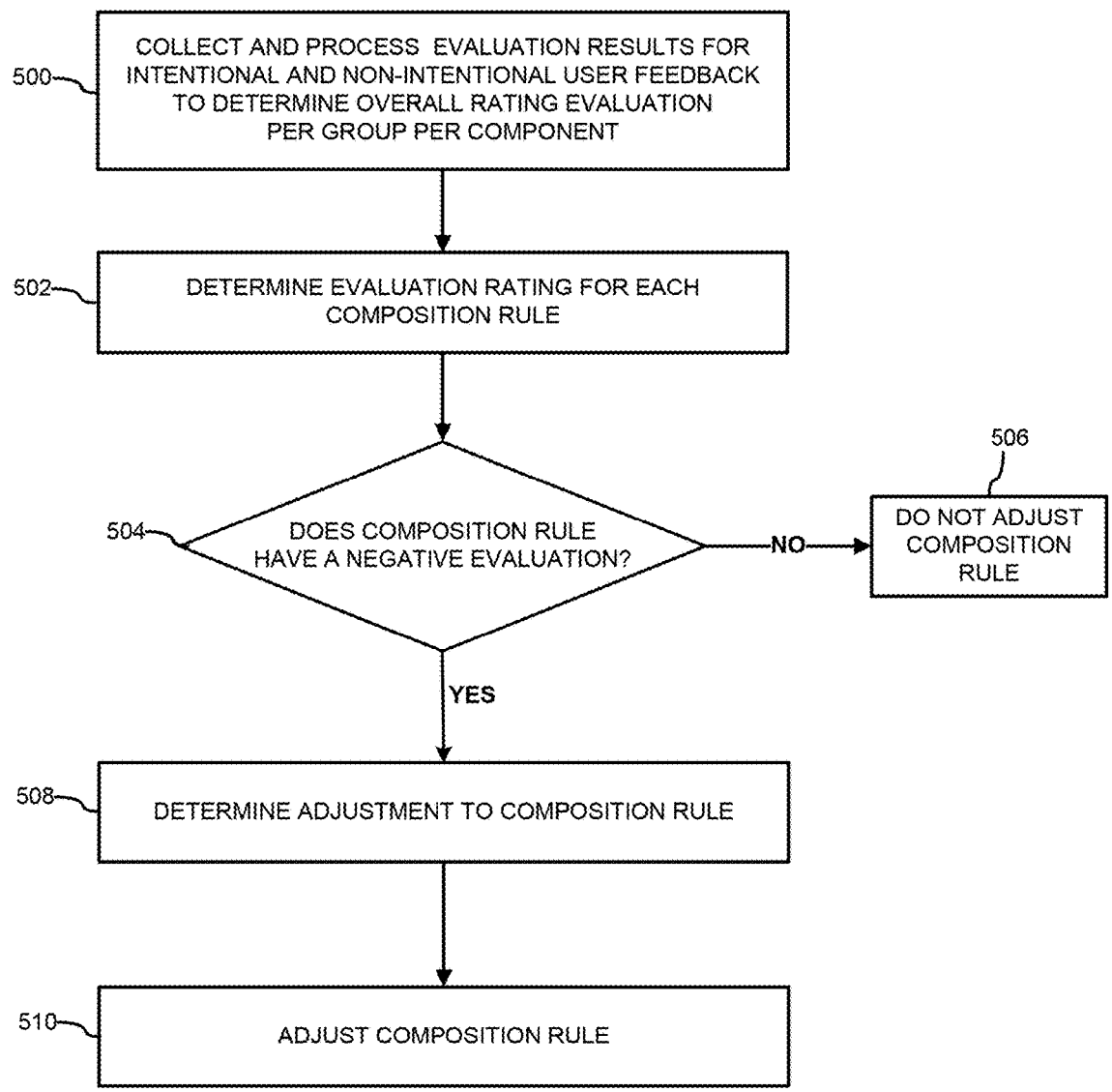
FIG. 16 is a flow diagram that illustrates a method for automatic adjustment of content composition rules based on evaluation of intentional user feedback and non-intentional user feedback obtained through a haptic interface, according to an embodiment of the invention.

FIG. 16 is a flow diagram that illustrates a method for automatic adjustment of content composition rules based on evaluation of intentional user feedback and non-intentional user feedback obtained through a haptic interface, according to an embodiment of the invention. In one embodiment of the invention, FIG. 16 illustrates a process flow implemented by the engine for automatic adjustment of composition rules 490 (FIG. 15). Therefore, for purposes of illustration, the method of FIG. 16 will be discussed in the context of the system of FIG. 15. An initial step in the process flow includes collecting and processing evaluation results generated for the intentional and non-intentional user feedback to determine an overall rating evaluation per each group of users per each component (block 500).

For example, in the system 400 depicted in FIG. 15, the engine for automatic adjustment of composition rules 490 will access the intentional and non-intentional user feedback data 462A and 462B, and collect information from the reports of summarized group reaction for haptic feedback markers and non-intentional gestures generated by the user feedback evaluation engines 480 and 482. This information comprises, for example, a table of evaluation results per component per group of users (e.g., information in data structure 200H, FIG. 9) and a table of evaluation results of non-intentional signals per component per group of users. The computation in block 500 yields a table of overall rating evaluation per group per component.

Next, the engine for automatic adjustment of composition rules 490 will determine an evaluation rating for each composition rule (block 502). This process cross-relates information from the table of overall rating evaluation per group per component (as determined in block 500) with a table of composition rules per component 400A (as shown in FIG. 17) and generates a table of component evaluation per composition rule 400B (as shown in FIG. 18). In particular, FIG. 17 shows a data structure 400A in the form of a table which includes various fields to store composition rules that are applied to generate each component of the digital content being analyzed. The fields include a Rule field that lists composition rule index (or Rule#), and a Component field that list an index of the associated component that was generated using the given composition rule. For example, FIG. 17 indicates that rule R1 was used to compose Component 1, and that rule R2 was used to compose Components 2 and 3, for example.

Moreover, FIG. 18 shows a data structure 400B in the form of a table which includes various fields to store an overall evaluation of each component per a composition rule applied to that component. This data structure 400B indicates, for example, that the application of composition rule R1 to compose Component 1 is favorable (i.e., + evaluation indicator), whereas the application of composition rule R2 to compose Components 1 and 2 is unfavorable.

Referring back to FIG. 16, the process (in block 502) generates an evaluation rating per composition rule, in particular, an overall evaluation rating per composition rule. For each composition rule whose evaluation rating is not negative (negative determination in block 504), e.g., the evaluation rating is positive, no adjustment is made to that composition rule (block 506). On the other hand, for each composition rule with a negative evaluation (affirmative decision in bock 504), a process is executed to determine an adjustment to that composition rule (block 508). In this process, the engine for self-adjustment of composition rules 490 will process the data structure 400B identify composition rules with negative evaluations.

In one embodiment of the invention, the process (in block 508) to determine an adjustment to a composition rule is implemented using a method which calculates an adjustment to be applied for a selected composition rule as a variation of a weight value associated with the composition rule applied to compose specific components for a target group profile. The process generates an estimate in an amount in which the given weight value is reduced taking into consideration the negative feedback that results based on the use of the given composition rule applied to compose the digital content.

The engine for automatic adjustment of composition rules 490 will use the adjustment value for a given composition rule to modify a table of composition rules 400C, as shown in FIG. 19. In particular, FIG. 19 illustrates a data structure 400C in the form of a table of composition rules comprising fields to store information regarding a list of composition rules, classified by weight, to be applied to generate specific components of digital content provided to a given group of users with certain group profiles. In particular, as shown in FIG. 19, the composition rules table 400C comprises a Rule index field, a Component index field, a Group Profile field and a Weight value field. The Weight value field specifies a weight value to be used in selecting a given composition rule to apply to compose a given component of content for a given group profile.

In the system 400 of FIG. 15, by automatically adjusting a parameter (e.g., weight value) utilized by the composition rules 122, the process implemented by the automatic composition module 120 will utilize dynamically updated composition to improve the quality of the digital content that is delivered to a target group of users. Over time, an iterative update and adjustment of the composition rules will serve to continuously improve the quality of digital content being delivered to various groups of users.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

These concepts are illustrated with reference to FIG. 20, which shows a computing node 10 comprising a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

Figure 20:
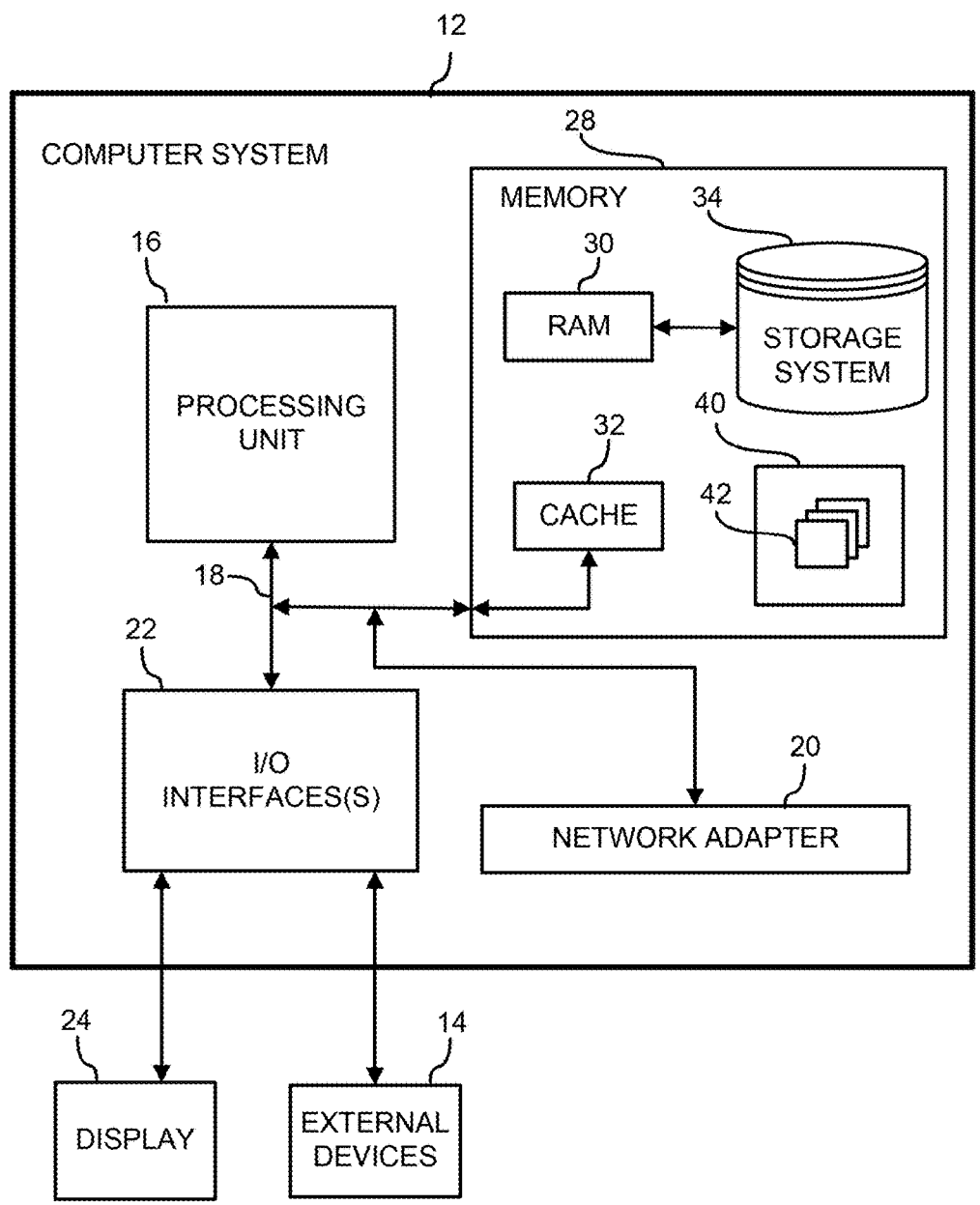
FIG. 20 illustrates a computer system that may be used to implement one or more components/steps of the techniques of the invention, according to an embodiment of the invention.

In FIG. 20, computer system/server 12 in computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

The bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The computer system/server 12 typically includes a variety of computer system readable media. Such media may be any available media that is accessible by computer system/server 12, and it includes both volatile and non-volatile media, removable and non-removable media.

The system memory 28 can include computer system readable media in the form of volatile memory, such as random access memory (RAM) 30 and/or cache memory 32. The computer system/server 12 may further include other removable/non-removable, volatile/nonvolatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As depicted and described herein, memory 28 may include at least one program product having a set (e.g., at least one) of program modules that are configured to carry out the functions of embodiments of the invention.

The program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc., one or more devices that enable a user to interact with computer system/server 12, and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computing device, comprising: a non-transitory memory configured to store program instructions; and a processor device configured to execute the program instructions stored in the memory to implement a process comprising: accessing, by the computing device, digital content from a content generation system, the digital, content comprising a plurality of content components and a plurality of haptic feedback markers, wherein the haptic feedback markers comprise interaction components to implement a haptic interface that allows a user to provide feedback as to the user's satisfaction or dissatisfaction of the content components of the digital, content, and wherein the content components of the digital content are automatically generated by the content generation system at least in part using content composition rules; displaying on a display of the computer device, the plurality of content components of the digital content together with the haptic feedback markers to implement the a corresponding haptic user interface which enables the user to interact with one or more of the displayed haptic feedback markers associated with the displayed content components of the digital content;

collecting, by the computing device, intentional user feedback data that is generated as a result of the user interacting with the one or more displayed haptic feedback markers, wherein the intentional user feedback data provides an indication as to the user's satisfaction or dissatisfaction of one or more of the content components the digital content displayed on the display of the computing device;

sending, by the computing device, the collected intentional user feedback data to a data processing system that is configured to evaluate a quality of the digital content based on the intentional user feedback data and modify one or more of the composition rules utilized by the content generation, system to generate the digital content; and accessing, by the computing device, a modified version of the digital content from die content generation system, the modified version of the digital content comprising modified versions of said one or more components of the digital content associated with the intentional user feedback data previously sent by the computing device to the data processing system.

2. The computing device of claim 1, wherein the intentional user feedback data is collected based on the user's physical manipulation of a haptic feedback marker.

3. The computing device of claim 2, wherein the user's physical manipulation comprises a determined amount of force applied to a touchscreen display by the user when selecting the haptic feedback maker.

4. The computing device of claim 1, wherein accessing the digital content from the content generation system comprises accessing customized digital content that is generated based on a user profile and previously collected and analyzed intentional user feedback data associated with the user.

5. A method comprising:

accessing, by a computing device, digital content from a content generation system, the digital content comprising a plurality of content components and a plurality of haptic feedback markers, wherein the haptic feedback markers comprise interaction components to implement a haptic interface that allows a user to provide feedback as to the user's satisfaction or dissatisfaction of the content components of the digital content, and wherein the content components of the digital content are automatically generated by the content generation system at least in part using content composition rules;

displaying on a display of the computing device, the plurality of content components of the digital content together with the haptic feedback markers to implement the haptic user interface which enables the user to interact with one or more of the displayed haptic feedback markers associated with the displayed content components of the digital content;

collecting, by the computing device, intentional user feedback data that is generated as a result of the user interacting with the one or more displayed haptic feedback markers, wherein the intentional user feedback data provides an indication as to the user's satisfaction or dissatisfaction of one or more components the digital content displayed on the display of the computing device;

sending, by the computing device, the collected intentional user feedback data to a data processing system that is configured to evaluate a quality of the digital content based on the intentional user feedback data and modify one or more of the composition rules utilized by the content generation system to generate the digital content; and accessing, by the computing device, a modified version of the digital content from the content generation system, the modified version of the digital content comprising modified versions of said one or more components of the digital content associated with the intentional user feedback data previously sent by the computing device to the data processing system.

6. The method of claim 5, wherein the intentional user feedback data is collected based on the user's physical manipulation of a haptic feedback marker.

7. The method of claim 6, wherein the user's physical manipulation comprises a determined amount of force applied to a touchscreen display by the user when selecting the haptic feedback maker.

8. The method of claim 5, wherein accessing the digital content from the content generation system comprises accessing customized digital content that is generated based on a user profile and previously collected and analyzed intentional user feedback data associated with the user.

9. An article of manufacture comprising a non-transitory computer readable storage medium having program instructions embodied thereon, wherein the program instructions are executable by a computer to cause the computer to perform the method of claim 5.

10. A method, comprising:

sending digital content from a content generation system to a computing device of a user, the digital content comprising a plurality of content components and a plurality of haptic feedback markers, wherein the haptic feedback markers comprise interaction components to implement a haptic interface that allows the user to provide feedback as to the user's satisfaction or dissatisfaction of the content components of the digital content, and wherein the content components of the digital content are automatically generated by the content generation system at least in part using content composition rules;

collecting intentional user feedback data which is generated as a result of the user interacting with one or more haptic markers of the haptic interface displayed on a display of the computing device, wherein the intentional user feedback data provides an indication as to a user's satisfaction or dissatisfaction of one or more components of the displayed digital content;

evaluating a quality of the digital content based on the intentional user feedback data; and modifying the content generation rules based on the evaluation of the quality of the digital content, wherein the method is implemented by a processor device executing program instructions.

11. The method of claim 10, wherein the intentional user feedback data is collected based on the user's physical manipulation of a haptic feedback marker.

12. The method of claim 11, wherein the user's physical manipulation comprises a determined amount of force applied to a touchscreen display by the user when selecting the haptic feedback maker.

13. The method of claim 10, wherein evaluating the quality of the digital content based on the intentional user feedback data comprises:
   performing a first evaluation process to evaluate intentional user feedback data from a plurality of users for a given gesture;
   performing a second evaluation process to evaluate intentional user feedback data for each component;
   cross-relating evaluation results for the first and second evaluation processes with regard to group profiles to determine an overall quality rating of components of the digital content; and
   generating an evaluation report that includes information providing an evaluation of the quality of the digital content, wherein the evaluation report is generated to provide an overall evaluation of a given component with regard to intentional feedback from a group of users associated with the group profile corresponding to the given component.

14. The method of claim 13, wherein performing the first evaluation process comprises classifying the intentional user feedback data based on rules for classifying gestures, based on rules for classifying gestures per user profile, and based on user profile data, and wherein performing the second evaluation process comprises cross-relating the intentional user feedback data with evaluation results of the first evaluation process.

15. An article of manufacture comprising a non-transitory computer readable storage medium having program instructions embodied thereon, wherein the program instructions are executable by a computer to cause the computer to perform the method of claim 10.

* * * * *